Nov. 30, 1948.                D. F. HERMAN                 2,455,058
            PROCESS FOR REACTING ACETYLENE AND POTASSIUM HYDROXIDE
                          Filed Sept. 12, 1946
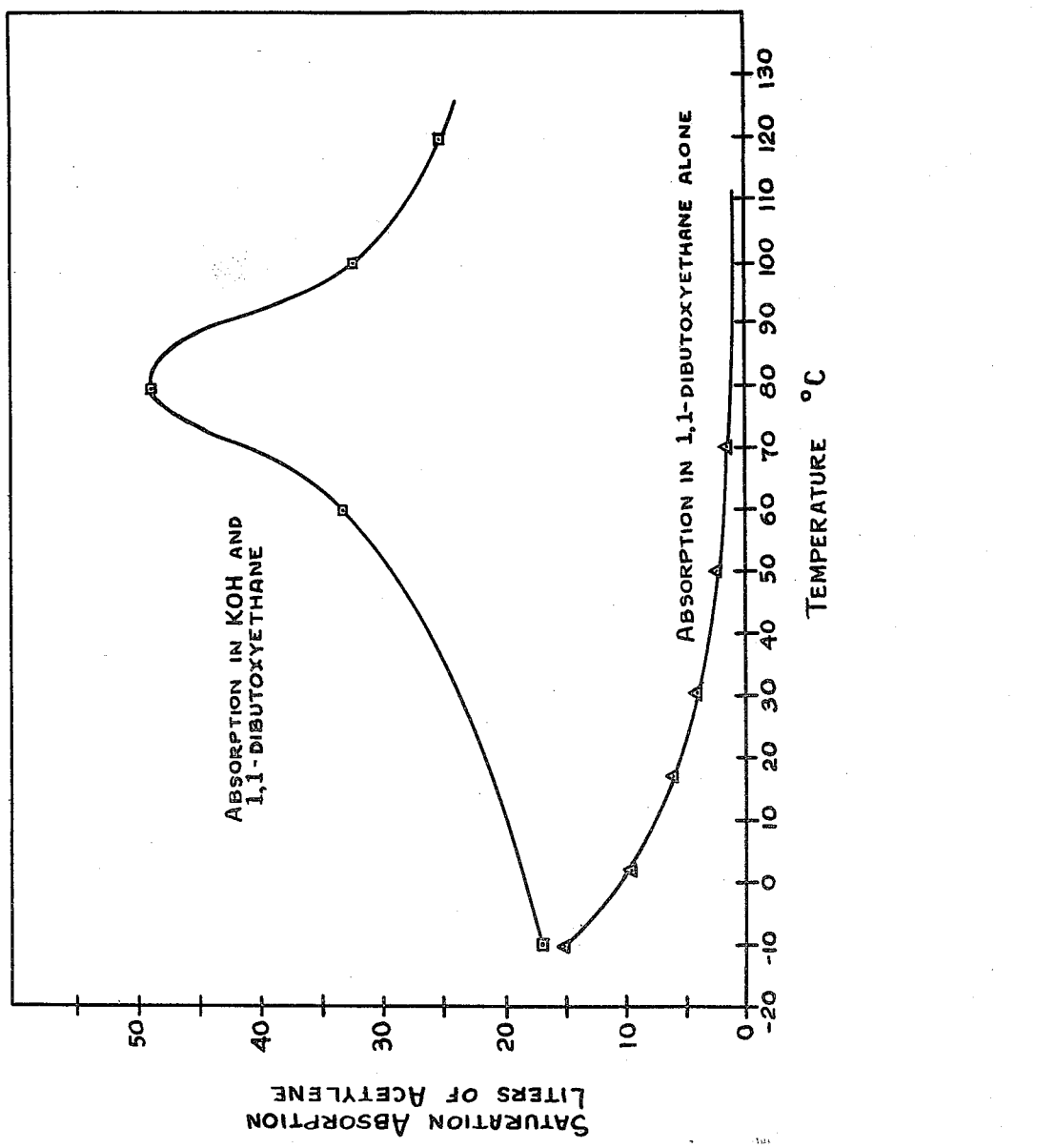
INVENTOR.
DANIEL F. HERMAN
BY Patented Nov. 30, 1948

2,455,058

UNITED STATES PATENT OFFICE 2,455,058

PROCESS FOR REACTING ACETYLENE AND POTASSIUM HYDROXIDE

Daniel F. Herman, Philadelphia, Pa., assignor to Publicker Industries Inc., Philadelphia, Pa.

Application September 12, 1946, Serial No. 696,599

11 Claims. (Cl. 260—665)

The present invention relates to reactions involving acetylene and it relates more particularly to the absorption of acetylene and its homologs and derivatives in organic suspensions of potassium hydroxide.

An object of the present invention is to provide a new and useful process for absorbing acetylene or the like in an organic solvent containing suspended potassium hydroxide. Another object of the present invention is to provide a new and improved process for forming potassium acetylide.

Other objects and advantages of the present invention are apparent in the following detailed description, appended claims and accompanying drawing, which is a graph showing the absorption of acetylene, at varying temperatures, in 1,1-dibutoxyethane alone, on the one hand, and in a suspension of potassium hydroxide in 1,1-dibutoxyethane, on the other hand.

In recent years reactions involving acetylene have assumed great importance and stimulated much research. One of the important technics used for reacting acetylene involves the absorption of the gas in a mixture of finely divided potassium hydroxide and an organic solvent and subsequently reacting with a second constituent such as an aldehyde or ketone. Following this procedure acetylene is generally passed into the potassium hydroxide-organic solvent mixture at a comparatively low temperature until saturation is reached and the second component is then added. Presumably during the absorption of acetylene a small amount of potassium acetylide is formed.

When acetylene is passed into such mixtures at these low temperatures comparatively little is absorbed; in fact, the absorption is only slightly greater than the solubility in the pure solvent alone, indicating that in the prior-art very little potassium acetylide is involved in reactions carried out at or about —10° C. If no potassium hydroxide is present the solubility of acetylene in the solvent decreases to practically zero as the temperature is increased.

I have now unexpectedly found that when acetylene is passed into a suspension of potassium hydroxide in an organic solvent, the absorption is greatly increased with rise in temperature until a peak is reached at a temperature of about 75–90° C.

While I do not wish to be bound by theories as to the nature of the reaction, I believe that this surprising increase in absorption, at the 75–90° C. temperature range is due to the formation of potassium acetylide, according to the following reaction which is favored by the higher temperature:

$$C_2H_2 + KOH \rightarrow KC \equiv CH + H_2O$$

I may carry on the absorption at a temperature range of about 50–120° C., and more preferably at about 60–100° C. and most preferably at a temperature of about 75–90° C.

Beyond the temperature range of maximum absorption, reversion takes place and the amount of acetylene that can be absorbed or maintained at the saturation point decreases.

This is well illustrated in the accompanying graph wherein the absorption of acetylene in a suspension of potassium hydroxide in 1,1-dibutoxyethane is compared with the absorption of acetylene in the solvent alone. In the accompanying graph, the absorption saturation curve is given for a reaction medium consisting of a suspension of 350 grams of potassium hydroxide in one liter of 1,1-dibutoxyethane.

The results are typical of absorptions in liquid organic media containing suspended potassium hydroxide in finely-divided form.

While the temperature of the absorption peak may vary somewhat depending on such factors as the purity of the potassium hydroxide, the nature of the organic solvent, the vapor pressure and other similar factors, I have found that optimum results are obtained within the temperature ranges specified above.

The low solubility of acetylene in the solvent alone indicates that substantially all of the acetylene which is absorbed at the higher temperatures reacts with potassium hydroxide to form potassium acetylide. This is further demonstrated by the fact that addition of water causes practically complete desorption.

It is apparent that, other factors being equal, the lower the water content of the potassium hydroxide, the higher the absorption of the acetylene.

According to well known physical principles, increased pressure will result in increased absorption, other factors being equal.

It is important that the potassium hydroxide be present in a finely-divided, well dispersed condition, in order to obtain maximum absorption.

Under favorable conditions, about one-half mole of acetylene can be absorbed for each mole of potassium hydroxide at 75–90° C. This amounts to an absorption which is more than three times as great as can be obtained at 0° to —10° C., which is the temperature range recommended in the prior-art for the absorption.

I have further unexpectedly found that, after the relatively large amount of acetylene has been absorbed at the 75–90° C. temperature, the mixture can be cooled substantially without desorption to a low temperature (about 0 to −20° C., and preferably −10° C.) which is most favorable for causing further reaction thereof with carbonyl compounds, in order to form acetylenic alcohols. For the preparation of acetylenic glycols by reacting one mol acetylene with 2 mols of a ketone or a suitable aldehyde, temperatures in the range of 0 to 30° C. are preferred.

Thus, according to my present invention, it is now possible to produce, in situ, a large reserve of acetylene compound suitable for use in condensation reactions with a variety of substances. In this way, it is possible to realize increased yields per unit volume of reaction medium and to decrease reaction time.

The potassium hydroxide may be disintegrated into the finely crystalline form preferred by any of the ways heretofore employed in the art; as for example by grinding or, preferably, by conditioning of the potassium hydroxide by heating, with or without an acetal or a monohydric alcohol in the presence of an inert solvent, above 100° C.

Indeed, one of the chief advantages of my novel process is that, by employing the relatively high temperature absorption method, in conjunction with organic solvent dispersions of potassium hydroxide obtained by means of novel conditioning agents, excellent conversions and yields of acetylenic alcohols can subsequently be obtained as indicated hereinbelow.

For example, a mixture of an inert organic solvent with potassium hydroxide and 1% of a conditioning compound (such as aniline or other suitable amine, or an ether such as dibutyl ether, or a polyhydric alcohol such as methylpentanediol, or a ketone such as acetone, or a salt such as potassium acetate) can be heated to a temperature sufficient to melt the potassium hydroxide, and cooled with agitation to 75—90° C., after which acetylene is passed into the slurry thus formed until saturation is reached. Over 80% of the acetylene required for the subsequent reaction is absorbed at this point.

The reaction mixture is then cooled to below 0° C. and a ketone or suitable aldehyde is added with continued addition of acetylene.

After the reaction has gone to completion, the acetylenic alcohol may be isolated by methods known in the art; excellent yields, generally over 90% being obtained.

I have found that, in addition to acetylene itself, homologs and other derivatives of acetylene having a hydrogen on a triple-bond carbon are effective in the method of the present invention; as for example, methyl acetylene, vinyl acetylene, etc.

In addition to its use in the preparation of acetylenic alcohols, the reaction medium of the present invention (namely, the medium containing acetylene absorbed in a suspension of potassium hydroxide in an organic solvent, with or without conditioning agents) can be used for other reactions known in the art, involving potassium acetylide or acetylene in the presence of alkaline catalysts.

The following are illustrative, but not restrictive, examples of the process of the present invention:

*Example 1*

One liter of 1,1-dibutoxyethane containing 350 g. of technical potassium hydroxide was heater with agitation to 150 C. and maintained at that temperature for ten minutes. The mixture was allowed to cool slowly to 120° C. where the potassium hydroxide was observed to be in a very finely divided, suspended form.

Acetylene measured by wet test meters, was passed into this mixture at 120 C. and a saturation absorption of 25.5 liters was found. The temperature was then dropped to 80° C. and an additional 23 liters absorbed to give a total saturation absorption of 48.5 liters. The temperature was raised to 120 C. with desorption of 24.5 liters of gas, leaving 24 liters in the mixture, a close check with the 25.5 liters originally absorbed at 120° C. This illustrates the reversibility of the acetylene absorption in the range of 80 to 120° C.

The mixture was next cooled to 60° C. without further desorption and again saturated with acetylene, picking up 9 additional liters to give a total absorption of 33 liters. Finally the temperature was raised again to 80° (without desorption) at which point an additional 14 liters was absorbed giving a total of 47 liters. Thus the total acetylene content was approximately the same as that obtained initially at 80° C. again illustrating the reversibility of the process. On cooling from this point to −10° C. no gas was desorbed. In a separate experiment with KOH suspension, the absorption at −10° C. was found to be 17 liters per liter of 1,1-dibutoxyethane.

These data are plotted in the accompanying graph. Also shown in this graph is the solubility curve of acetylene in 1,1-dibutoxyethane. The solubility was measured by passing a continuous stream of gas through an inlet wet test meter into 1000 ml. of solvent and out through a second wet test meter until saturation was reached. At −10° C. 15 liters of acetylene was absorbed. At 100° C. the solubility was practically nil. Intermediate points were determined by heating slowly with agitation, a saturated solution from −10° C. to 100° C. The expelled gas was measured with a wet test meter. The following results were obtained.

| Temperature | Solubility per 1000 ml. |
| --- | --- |
| *Degrees* | *Liters* |
| −10 | 15 |
| −8 | 13 |
| −3 | 11 |
| −2 | 9.5 |
| 7 | 8 |
| 17 | 6 |
| 22 | 5 |
| 30 | 4 |
| 50 | 2.5 |
| 70 | 1.25 |
| 100 | ----------- |

The plot of the two absorption curves shows that at −10° very little if any potassium acetylide is formed and that in the range of 50–120 C. essentially all of the absorption is due to formation of this compound.

*Example 2*

A series of paired experiments on the preparation of 2-methyl-3-butyn-2-ol was performed to illustrate the improved conversion and yield to be derived from first preparing potassium acetylide at 75–90° C. and then condensing the acetylide with acetone at −10° C. For comparison the second reaction of each pair was carried out entirely at −10° C., where it has been shown that little if any potassium acetylide is formed. In all cases listed in the table below the medium used was xylene containing approximately 1% of various adducts used as a dispersing agent.

| Experiment | Medium | Adduct | Initial Absorption Conditions | Per cent Acetone Converted | Yield based on Converted Acetone |
|---|---|---|---|---|---|
| | | | Degrees | Per cent | Per cent |
| (1) a | Xylene, 1000 ml | Potassium acetate, 10 g | 75–90 | 99+ | 96.5 |
| b | do | do | −10 | 61.5 | 71.3 |
| (2) a | do | Aniline, 10 cc | 75–90 | 93 | 93 |
| b | do | do | −10 | 74.0 | 88 |
| (3) a | do | Acetone, 10 cc | 75–90 | 86 | 87.2 |
| b | do | do | −10 | 66.6 | 72.5 |
| (4) a | do | Dibutyl ether, 10 cc | 75–90 | 88.5 | 88.4 |
| b | do | do | −10 | 63.3 | 84 |

In the above examples the marked beneficial effect of the initial acetylene absorption at 75–90° is shown.

The following are specific examples using aniline as an adduct.

(a) To 1000 ml. of technical xylene was added 350 g. technical potassium hydroxide flakes. The mixture was heated to reflux with agitation and 10 ml. aniline was added. The reaction medium was then cooled to 80° C. and the potassium hydroxide was observed to be in a finely dispersed crystalline form. Acetylene was absorbed exothermically to the extent of 45 liters at 75–90° C. The product was cooled with agitation to −10° C. and 180 ml. acetone was added in one-half hour along with continued acetylene absorption. For one hour after the acetone had been added, acetylene was passed in to give a total absorption of 62.5 liters. Seven hundred ml. of cold water was added to the reaction mixture and the two phases separated. The total amount of methylbutynol recovered from both phases was 173.8 g. Ten grams of acetone was recovered. Conversion 93.0%; yield based on conversion 93.3%.

(b) As before 1000 ml. of xylene and 350 g. of potassium hydroxide flakes were heated to reflux with agitation. Ten milliliters of aniline were added and the mixture cooled slowly to −10° C. with agitation. The potassium hydroxide was finely dispersed. Only nine liters of acetylene were required to saturate the mixture as compared with 45 liters in Example 2(a). The reaction was then completed as in part (a). The product was diluted with 700 ml. of water and 132.9 g. of methylbutynol recovered from both phases.

Conversion 74%; yield based on conversion 88%. Total acetylene absorption 50 liters.

Example 3

A mixture of 700 g. of potassium hydroxide flakes and 2 liters of 1,1-dibutoxyethane was heated with agitation to 150° C. After 15 minutes at 150° C. the temperature was allowed to drop slowly to 68° C. At this point the potassium hydroxide was observed to be in a very finely dispersed form. Acetylene addition was begun and in one hour 101 liters were absorbed causing a temperature rise to 90° C. Five moles of butanol were added in one and three quarter hours. Acetylene addition was continued for 8 hours. The total acetylene absorption was 136 liters. Initially, a portion of the acetylene was desorbed but this soon stopped and a rapid absorption took place until the reaction was complete. The product was diluted with 1400 ml. of cold water and the organic layer was neutralized with carbon dioxide and distilled. n-Vinyl butyl ether was obtained, B. P. 93° C.

Conversion of butanol 69.0%
Yield based on conversion 69.7%

Example 4

A finely-divided suspension of 175 g. of technical potassium hydroxide in 500 ml. of xylene was formed by agitating and heating the mixture to reflux temperature in the presence of 5 ml. of dibutyl ether, maintaining the reflux for 10 minutes and then cooling to 80° C. 2-methyl-1,3-butenyne vapor was passed in below the surface of the mixture at 75–90° C. until saturation was reached. The balance was determined by condensing and weighing unabsorbed methylbutenyne. Of 165 g. methylbutenyne passed into the mixture in this way, 144.5 g. was absorbed. Thus the absorption saturation per liter of xylene containing 350 g. of potassium hydroxide is 289 g. In a similar manner, the solubility of methylbutenyne at 80° C. in the absence of potassium hydroxide was found to be 155.6 g. per liter. Therefore, the saturation absorption in the presence of potassium hydroxide was nearly twice the solubility in xylene alone. The resulting mixture was found to be highly suitable for subsequent condensation with ketones and aldehydes.

The present invention may be embodied in other specific forms and, accordingly, reference is made to the appended claims, rather than to the foregoing description, to indicate the scope of this invention.

Having thus described my invention, I claim as new and desire to protect by Letters Patent:

1. A process of the character described comprising forming a suspension of finely-divided potassium hydroxide in a substantially water-immiscible organic solvent chemically inert to an acetylenic hydrocarbon having an active hydrogen atom, adjusting the temperature of said suspension to about 75–90° C., and passing in acetylene while maintaining the temperature at about 75–90° C.

2. A process of the character described comprising forming a suspension of finely-divided potassium hydroxide in a substantially water-immiscible organic solvent chemically inert to an acetylenic hydrocarbon having an active hydrogen atom, adjusting the temperature of said suspension to about 60–100° C., and passing in acetylene while maintaining the temperature at about 60–100° C.

3. A process of the character described comprising forming a suspension of finely-divided potassium hydroxide in a substantially water-immiscible organic solvent chemically inert to an acetylenic hydrocarbon having an active hydrogen atom, adjusting the temperature of said suspension to about 50–120° C., and passing in acetylene while maintaining the temperature at about 50–120° C.

4. A process of the character described comprising forming a suspension of finely-divided potassium hydroxide in a substantially water-immiscible organic solvent chemically inert to an acetylenic hydrocarbon having an active hydrogen atom, adjusting the temperature of said suspension to about 75-90° C., saturating said suspension with acetylene while maintaining the temperature at about 75-90° C., and thereafter cooling the suspension without appreciable desorption of acetylene.

5. A process of the character described comprising the steps of heating a mixture of potassium hydroxide and a substantially water-immiscible inert organic solvent above 100° C., cooling the mixture to form a suspension of finely-divided potassium hydroxide in said organic solvent, and passing in acetylene while maintaining the temperature of said suspension at about 75-90° C.

6. A process of the character described comprising forming a suspension of finely-divided potassium hydroxide in a substantially water-immiscible inert organic solvent, adjusting the temperature to about 75-90° C., and passing in a member of the group consisting of acetylene and its homologs and derivatives having a hydrogen on a triple-bond carbon, while maintaining the temperature at about 75-90° C.

7. A process of the character described comprising forming a suspension of finely-divided potassium hydroxide in a substantially water-immiscible inert organic solvent, adjusting the temperature to about 50-120° C. and passing in a member of the group consisting of acetylene and its homologs and derivatives having a hydrogen on a triple-bond carbon, while maintaining the temperature at about 50-120° C.

8. A process of the character described comprising forming a suspension of finely-divided potassium hydroxide in 1,1-dibutoxyethane, and adjusting the temperature of said suspension to about 75-90° C., and passing in acetylene to substantial saturation.

9. A process of the character described comprising forming a suspension of finely-divided potassium hydroxide in xylene, adjusting the temperature of said suspension to about 75-90° C., and passing in acetylene to substantial saturation.

10. A process of the character described comprising the steps of heating a mixture of potassium hydroxide and 1,1-dibutoxyethane above 100° C., cooling to form a suspension of finely-divided potassium hydroxide in said 1,1-dibutoxyethane, and passing in acetylene while maintaining the temperature at about 75-90° C.

11. A process of the character described comprising the steps of heating a mixture of potassium hydroxide and xylene above 100° C., cooling to form a suspension of finely-divided potassium hydroxide in said xylene, and passing in acetylene while maintaining the temperature at about 75-90° C.

DANIEL F. HERMAN.

REFERENCES CITED

The following references are of record in the file of this patent:

UNITED STATES PATENTS

| Number | Name | Date |
|---|---|---|
| 2,161,191 | Perkins | June 6, 1939 |
| 2,385,547 | Smith | Sept. 25, 1945 |
| 2,385,548 | Smith | Sept. 25, 1945 |